United States Patent
Sprouse et al.

(10) Patent No.: US 7,731,783 B2
(45) Date of Patent: Jun. 8, 2010

(54) CONTINUOUS PRESSURE LETDOWN SYSTEM

(75) Inventors: Kenneth M. Sprouse, Northridge, CA (US); David R. Matthews, Simi Valley, CA (US); Terry Langowski, Renton, WA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 802 days.

(21) Appl. No.: 11/657,254

(22) Filed: Jan. 24, 2007

(65) Prior Publication Data
US 2008/0173174 A1 Jul. 24, 2008

(51) Int. Cl.
*B01D 46/00* (2006.01)

(52) U.S. Cl. .............................. 95/273; 48/128; 48/190; 96/372; 96/379; 55/341.1; 55/418; 414/206; 414/216; 432/233; 432/238

(58) Field of Classification Search ................... 55/302, 55/385.1, 341.1, 418; 95/273, 177, 180, 95/211, 265; 110/336, 204, 205, 297, 303, 110/305, 308, 314; 60/756, 757, 758, 760, 60/753, 755; 432/233, 238; 96/372, 379; 48/128, 190; 414/216, 206
See application file for complete search history.

(56) References Cited

U.S. PATENT DOCUMENTS

| | | | |
|---|---|---|---|
| 3,884,649 A | 5/1975 | Matthews | |
| 3,918,255 A * | 11/1975 | Holden | 60/753 |
| 3,954,389 A * | 5/1976 | Szetela | 431/353 |
| 4,073,629 A | 2/1978 | Funk | |
| 4,153,427 A | 5/1979 | Bissett et al. | |
| 4,206,713 A | 6/1980 | Ryason | |
| 4,362,500 A * | 12/1982 | Eriksson et al. | 431/352 |
| 4,451,184 A | 5/1984 | Mitchell | |
| 4,488,838 A | 12/1984 | Herud | |
| 4,518,567 A | 5/1985 | Velling et al. | |
| 4,695,214 A | 9/1987 | Scinta | |
| 6,053,632 A | 4/2000 | Leininger | |
| 6,418,973 B1 * | 7/2002 | Cox et al. | 139/383 R |
| 2005/0072341 A1 | 4/2005 | Sprouse | |
| 2005/0288382 A1 | 12/2005 | Tuzson et al. | |

OTHER PUBLICATIONS

International Search Report and Written Opinion for PCT/US08/00803, Mailed May 23, 2009, 10 pages.

* cited by examiner

*Primary Examiner*—Duane Smith
*Assistant Examiner*—Minh-Chau T Pham
(74) *Attorney, Agent, or Firm*—Kinney & Lange, P.A.

(57) ABSTRACT

A continuous pressure letdown system connected to a hopper decreases a pressure of a 2-phase (gas and solid) dusty gas stream flowing through the system. The system includes a discharge line for receiving the dusty gas from the hopper, a valve, a cascade nozzle assembly positioned downstream of the discharge line, a purge ring, an inert gas supply connected to the purge ring, an inert gas throttle, and a filter. The valve connects the hopper to the discharge line and controls introduction of the dusty gas stream into the discharge line. The purge ring is connected between the discharge line and the cascade nozzle assembly. The inert gas throttle controls a flow rate of an inert gas into the cascade nozzle assembly. The filter is connected downstream of the cascade nozzle assembly.

20 Claims, 6 Drawing Sheets

CONTINUOUS PRESSURE LETDOWN SYSTEM

STATEMENT REGARDING FEDERALLY SPONSORED RESEARCH OR DEVELOPMENT

This invention was made with the support of the United States Government under Contract No. DE-FC26-04NT42237 awarded by the Department of Energy (DOE). The United States Government has certain rights in the invention.

BACKGROUND OF THE INVENTION

The present invention generally relates to advanced coal gasification systems. In particular, the present invention relates to a continuous coal gasification system.

The gasification process involves turning coal or other carbon-containing materials into dusty gas, such as hydrogen and carbon monoxide. Because coal costs less than natural gas and oil, there is a large economic incentive to develop gasification technology. An issue with existing gasification technologies is that they generally have high capital costs and/or relatively low availability. Availability refers to the amount of time the equipment is on-line and making products. One cause for low availability is that current coal gasification systems operate as batch processes for filtering ash particles from the synthesis gas stream.

Many current coal gasification systems use downstream cyclone and candle filters for separating small micron (i.e., approximately 0.1 microns to approximately 100 microns) size ash particles from the product synthesis gas stream. The cyclones and candle filters are designed to drop solid dry ash particles in the synthesis gas stream into a bottom hopper by gravity for subsequent transfer from high pressure to ambient pressure (i.e. approximately 1000 pounds per square inch to approximately 14.7 pounds per square inch). The transfer of these dry ash particles from high pressure to ambient pressure is commonly performed with complex lock hopper subsystems. Lock hoppers are typically large in size and operate in batch mode.

While efficient, one concern with using lock hoppers is that they can produce significant transient upset conditions in a continuous gasification process. This is due to the fact that lock hoppers include a plurality of valves which must be repeatedly opened and closed. In addition, the valves are exposed to significant amounts of dry ash particles and typically have a very short lifetime due to the abrasive solids particles which continually erode the valves each time the valves are cycled. When the valves are being replaced, the gasification system must be shut down, costing valuable operating time.

By eliminating lock hoppers from the gasification system, the gasification system may be able to operate continuously, rather than in batch mode with a nominal frequency of 24 cycles per day.

BRIEF SUMMARY OF THE INVENTION

A continuous pressure letdown system connected to a hopper decreases a pressure of a 2-phase (gas and solid) dusty gas stream flowing through the system. The system includes a discharge line for receiving the dusty gas from the hopper, a valve, a cascade nozzle assembly positioned downstream of the discharge line, a purge ring, an inert gas supply connected to the purge ring, an inert gas throttle, and a filter. The valve connects the hopper to the discharge line and controls introduction of the dusty gas stream into the discharge line. The purge ring is connected between the discharge line and the cascade nozzle assembly. The inert gas throttle controls a flow rate of an inert gas into the cascade nozzle assembly. The filter is connected downstream of the cascade nozzle assembly.

DETAILED DESCRIPTION

Figure 1:
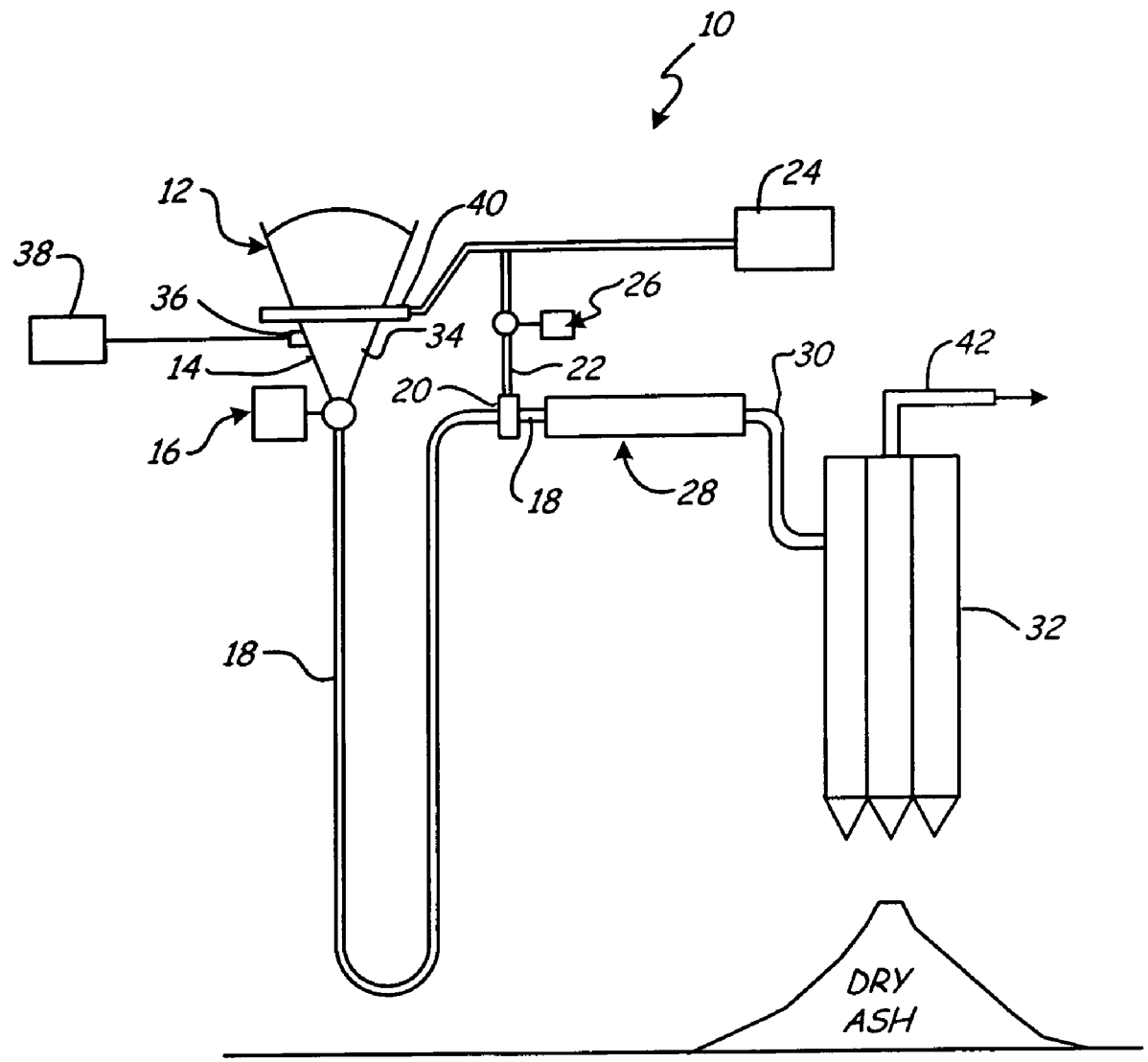
FIG. 1 is a schematic view of a continuous solids pressure letdown system.

FIG. 1 shows a schematic view of continuous solids pressure letdown system 10 for use with a gasification system 12. System 10 eliminates the need for cycling lock hoppers, allowing system 10 to operate continuously rather than in a cycling batch mode. The overall size of system 10 is also reduced by eliminating the cycling lock hoppers, which generally require a significant amount of space due to their large size. With continuous operation, (i.e. a cycling frequency of zero) system 10 has a longer expected life, lower maintenance costs, and increased mean time between failures (MTBFs). In addition, by eliminating the need for cycling lock hoppers, the capital equipment costs of system 10 are also significantly reduced. In an exemplary embodiment, system 10 is used in conjunction with a coal gasification system flowing approximately 400 tons of dry ash particles per day.

As can be seen in FIG. 1, system 10 is connected to a hopper 14 of gasification system 12. Hopper 14 of gasification system 12 is generally a cyclone or candle filter used to separate dry ash particles from the dusty gas stream. System 10 generally includes solids valve 16, discharge line 18, purge ring 20, throttling gas line 22, inert gas supply 24, throttle valve 26, cascade nozzle assembly 28, intermediate line 30, and filter 32. Solids valve 16 is positioned between a discharge end 34 of hopper 14 and discharge line 18 and controls the initiation or termination of the two-phase dusty gas flow made up of inert gas and dry ash particles (i.e., the dusty gas stream), entering discharge line 18. Solids valve 16 is designed to always be in the open position during normal operation and only close when gasification system 12 is shut down. In an exemplary embodiment, solids valve 16 is a non-cycling ball valve.

As the dusty gas stream flows through discharge line 18, the pressure of the dusty gas stream decreases and the void fraction increases. In an exemplary embodiment, the dusty gas stream entering discharge line 18 has a pressure of approximately 1000 pounds per square inch, a velocity of between approximately 10 feet per second (ft/sec) and approximately 60 ft/sec, and a void fraction of approximately 55% by volume. Discharge line 18 has a length sufficient to increase the void fraction of the dusty gas stream to approximately 80% by volume and to increase the dusty gas stream to a flow rate of approximately 150 ft/sec by the time the dusty gas stream reaches cascade nozzle assembly 28. The increase in the void fraction is due to the expansion of the inert gas in the dusty gas stream, which undergoes a pressure drop when flowing through discharge line 18. Discharge line 18 has a length of between approximately 94 feet and approximately 200 feet. In an exemplary embodiment, discharge line 18 has a diameter of approximately 1.25 inches, a length of approximately 200 feet, and reduces the pressure of the dusty gas stream from approximately 1000 pounds per square inch to approximately 300 pounds per square inch.

Purge ring 20 is a flanged device installed on discharge line 18 between hopper 14 and cascade nozzle assembly 28 and is also connected to throttling gas line 22. Purge ring 20 serves two purposes. The first purpose is to prevent the dry ash particles in the dusty gas stream from causing bridging and plugging problems at the junction of throttling gas line 22 and discharge line 18 immediately upstream of cascade nozzle assembly 28. The second purpose is to control the flow rate of the dusty gas stream in discharge line 18 entering cascade nozzle assembly 28. Purge ring 20 accomplishes these purposes by allowing inert gas from inert gas supply 24 to enter discharge line 18 just upstream of cascade nozzle assembly 28. Purge ring 20 will be discussed in more detail in FIGS. 2A-2C.

Inert gas supply 24 and throttle valve 26 work in conjunction with one another and with purge ring 20 to control the flow rate of the dusty gas stream entering cascade nozzle assembly 28. The flow rate of the dusty gas stream in discharge line 18 can be varied to match normal gasification process changes by trimming throttle valve 26 between the open and closed position. When throttle valve 26 is in the open position, inert gas from inert gas supply 24 is allowed to flow through throttling gas line 22 to discharge line 18 just upstream of cascade nozzle assembly 28. This increases the back pressure in discharge line 18 and reduces the flow rate of the dusty gas stream. As throttle valve 26 is turned to the closed position, the flow rate of the inert gas decreases, reducing the back pressure in discharge line 18 and increasing the flow rate of the dusty gas stream through discharge line 18. The inert gas housed in inert gas supply 24 can include, but is not limited to: nitrogen and carbon dioxide.

Hopper 14 may also include sensor 36 connected to control system 38 for setting and trimming throttle valve 26. Trimming is necessary so that hopper 14 is neither overfilled with solids nor completely empty. If hopper 14 is overfilled, hopper 14 will not properly filter the solids from the dusty gas. If hopper 14 is empty, there may be a detrimental discharge of the dusty gas and dry ash particles into filter 32, leading to a potential failure of filter 32. In operation, when sensor 36 senses that the level of solids in hopper 14 is too low, control system 38 opens throttle valve 26 to allow more inert gas to enter discharge line 18 just upstream of cascade nozzle assembly 28. The inert gas builds up back pressure in discharge line 18 and slows the flow of dusty gas stream coming from hopper 14, allowing the solids bed of dry ash particles in hopper 14 to build back up. When sensor 36 senses that the solids bed height in hopper 14 is becoming too high, control system 38 sends a signal and closes down throttle valve 26 to reduce the flow rate of the inert gas coming through to discharge line 18. This will effectively lower the back pressure into cascade nozzle assembly 28, allowing the flow rate of the dusty gas stream to increase coming out of hopper 14. In an exemplary embodiment, sensor 36 is a nuclear level indicator and control system 38 is an analog/digital process control system.

Inert gas supply 24 is also connected to hopper 14 by gas manifold 40. A small amount of inert gas continuously flows from inert gas supply 24 through gas manifold 40 to hopper 14 to displace the gas that is initially contained within the interstices of the dry ash particles before they reach discharge end 34 of hopper 14 and pass through solids valve 16 into discharge line 18. This prevents the loss of original process gas (i.e. synthesis gas) to the environment.

After the dusty gas stream passes through purge ring 20, the dusty gas stream flows through cascade nozzle assembly 28. Cascade nozzle assembly 28 is designed to drop the pressure of the dusty gas stream to ambient environmental conditions, or approximately 14.7 pounds per square inch. The dusty gas stream must be reduced to ambient pressure prior to entering filter 32 in order to be safely vented to the atmosphere. Cascade nozzle assembly 28 is made from a hardened material such that it is capable of withstanding the abrasive environment of the high speed dusty gas stream flowing through cascade nozzle assembly 28. For example, cascade nozzle assembly 28 may be formed from materials including, but not limited to: carbon steel, tool steel, and abrasion resistant coatings. An example of a commercially available abrasion resistant coating is Stellite. Cascade nozzle assembly 28 will be discussed in more detail in FIG. 3.

Once the dusty gas stream reaches ambient pressure, the dusty gas stream is sent from cascade nozzle assembly 28 to filter 32 through intermediate line 30. Filter 32 removes the dry ash particles from the dusty gas. The filtered dusty gas is then vented through gas vent line 42 to the atmosphere. In an exemplary embodiment, the void fraction of the inert gas leaving filter 32 is essentially 100% by volume, or between approximately 98% by volume and approximately 99% by volume. Filter 32 may be any type of filter for removing particles from a gas stream, including, but not limited to, a baghouse.

Figure 2A:
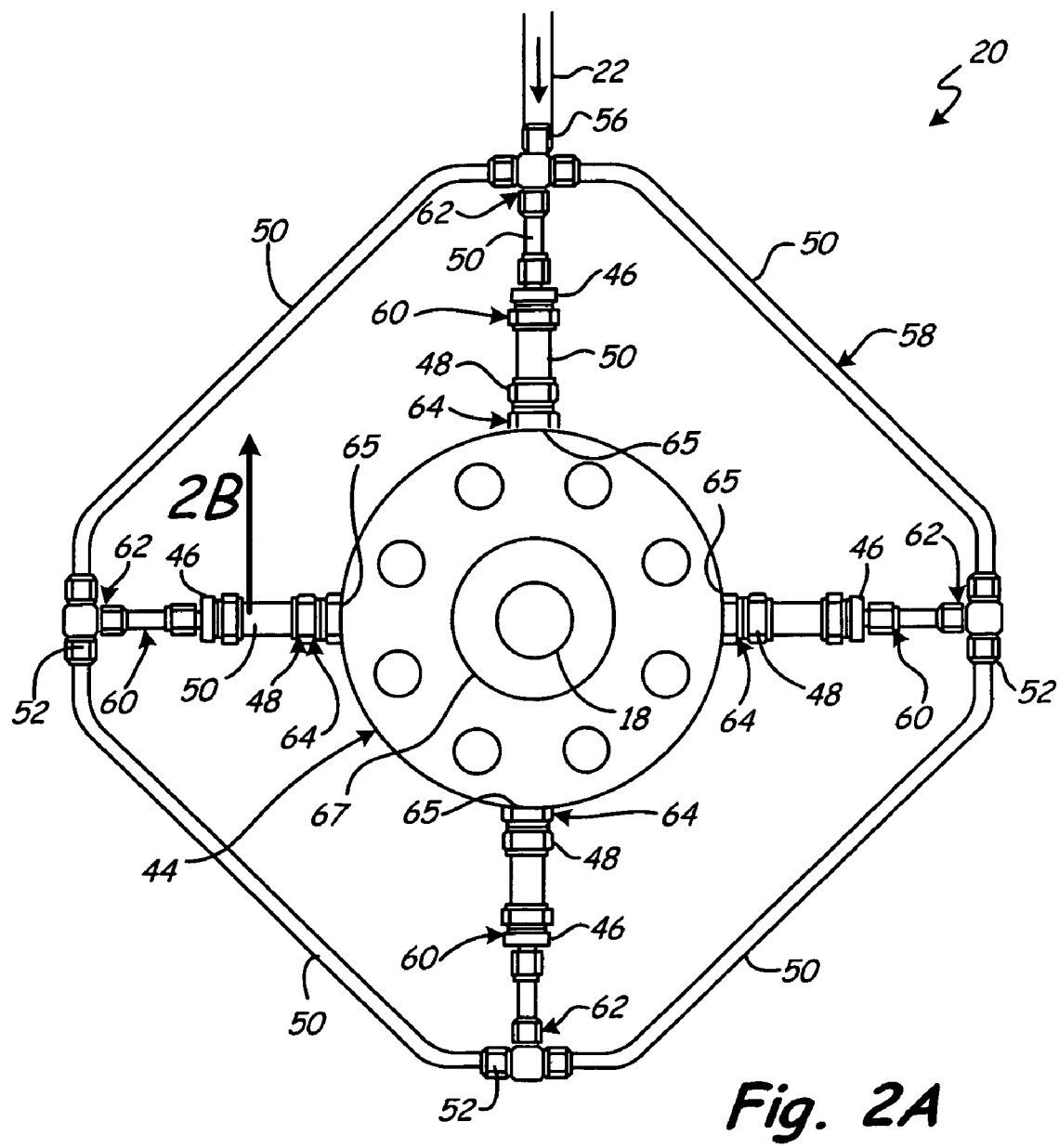
FIG. 2A is an enlarged top view of a purge ring of the continuous solids pressure letdown system.
Figure 2B:
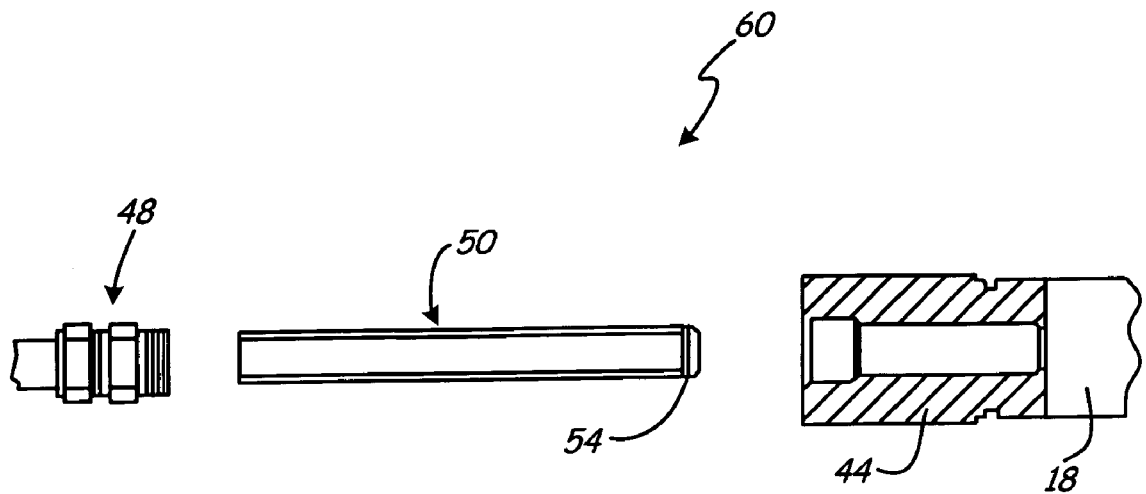
FIG. 2B is an exploded, partial sectional side view of a purge ring of the continuous solids pressure letdown system.
Figure 2C:
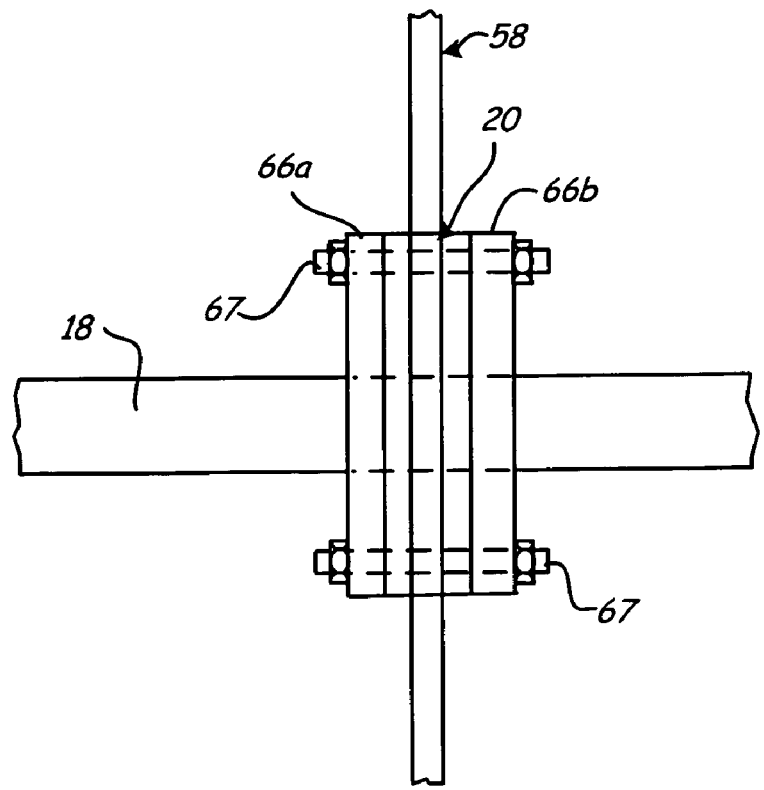
FIG. 2C is an enlarged, side view of the purge ring bolted onto a discharge line.

FIGS. 2A and 2B show an enlarged top view and an exploded, partial sectional view of purge ring 20, respectively. FIG. 2C shows an enlarged, side view of purge ring 20 bolted onto discharge line 18. FIGS. 2A-2C will be discussed in conjunction with one another. Purge ring 20 generally includes junction flange 44 surrounded by a plurality of reduce-fittings 46, union-fittings 48, tubes 50, tee-fittings 52, porous plates 54, and cross-fitting 56. Purge ring 20 is also connected to inert gas supply 24 (shown in FIG. 1) by cross-fitting 56. As previously mentioned, purge ring 20 prevents the dry ash particles in the dusty gas from entering and contaminating inert gas supply 24. Purge ring 20 also distributes the inert gas into discharge line 18 in a manner that leaves the walls of discharge line 18 smooth to the dry ash particles in the dusty gas, preventing bridging of the dry ash particles at junction flange 44 between discharge line 18 and throttling gas line 22. In an exemplary embodiment, purge ring 20 is formed of stainless steel.

Reduce-fittings 46, union-fittings 48, tubes 50, tee-fittings 52, porous plates 54, and cross-fitting 56 form a wagon wheel type ring manifold 58 having radial spokes 60. Each of radial spokes 60 has a first end 62 connected to ring manifold 58 and a second end 64 connected to a porous plate 54. Radial spokes 60 allow the inert gas from inert gas supply 24 and throttling gas line 22 (shown in FIG. 1) to reach junction flange 44. Junction flange 44 has four holes 65 that are engaged by porous plates 54 and pilots 67 for mating with end flanges 66a and 66b of discharge line 18. The inert gas is then evenly distributed around the internal circumference of discharge line 18 at holes 65 of junction flange 44 by radial spokes 60. Radial spokes 60 are placed within ring manifold 58 to a depth so that the downstream faces of porous plates 54 are flush with the internal surface of discharge line 18. Although FIG. 2A depicts purge ring 20 as being a four point purge system, purge ring 20 may have any number of radial spokes 60 for passing inert gas into discharge line 18.

Porous plates 54 of purge ring 20 separate the dusty gas stream flowing through discharge line 18 and the inert gas stream from throttling gas line 22 to prevent the dry ash particles in the dusty gas from getting into throttling gas line 22. The porosity of porous plates 54 are selected to prevent dry ash particles in the dusty gas from entering ring manifold 58 when throttling valve 26 is in the closed position and there is no inert gas entering purge ring 20. In an exemplary embodiment, porous plates 54 are approximately 0.25 inches thick with a slight curvature to match the inside radius of discharge line 18 so that any surface discontinuities are kept to less than approximately 0.025 inches in order to prevent the dry ash particles in the dusty gas from bridging and plugging discharge line 18.

Each of porous plates 54 are inserted into holes 65 of junction flange 44, which is bolted onto end flanges 66a and 66b of discharge line 18 by bolts 67. Thus, from porous plates 54, the inert gas enters discharge line 18 at junction flange 44. In operation, inert gas is supplied from throttling gas line 22 into ring manifold 58 at cross-fitting 56. Thus, as the inert gas enters ring manifold 58, the inert gas splits off into three directions. One direction takes the inert gas straight into a porous plate 54 and the other two directions branch off into ring manifold 58 and feed inert gas to the other porous plates 54. Thus, the inert gas enters discharge line 18 from purge ring 20 from four different directions. As shown in FIG. 2A, throttling gas line 22 sends inert gas through purge ring 20 to discharge line 18 in a direction perpendicular to the flow of the dusty gas stream, which is flowing through the page in which FIG. 2A is depicted. In an exemplary embodiment, purge ring manifold system 42 uses piping having a diameter of approximately 0.5 inches.

Figure 3:
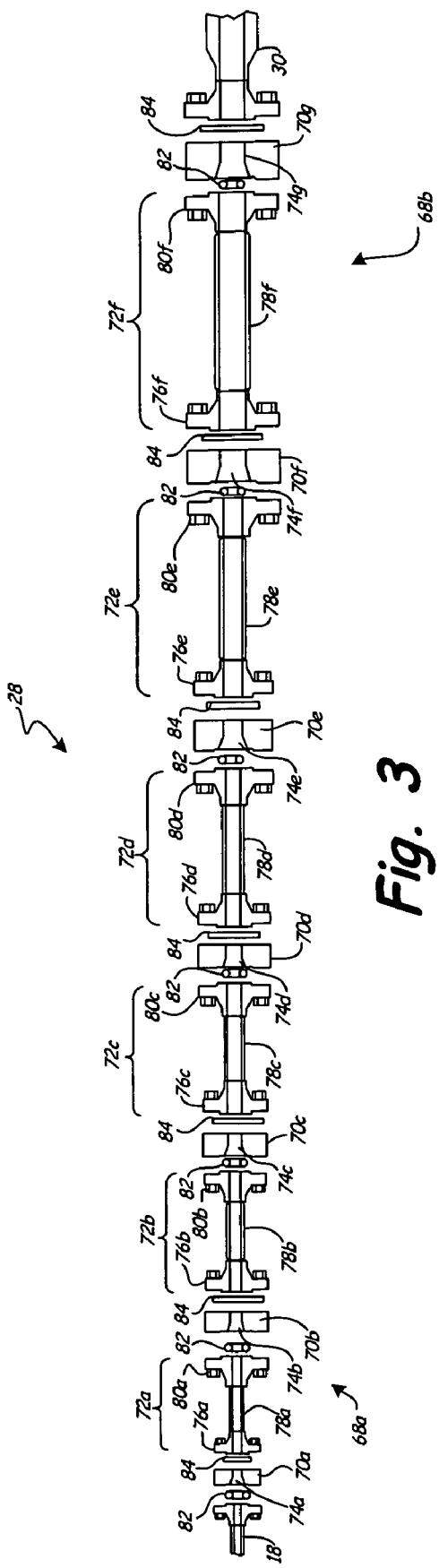
FIG. 3 is an exploded view of a cascade nozzle assembly of the continuous solids pressure letdown system.
Figure 4:
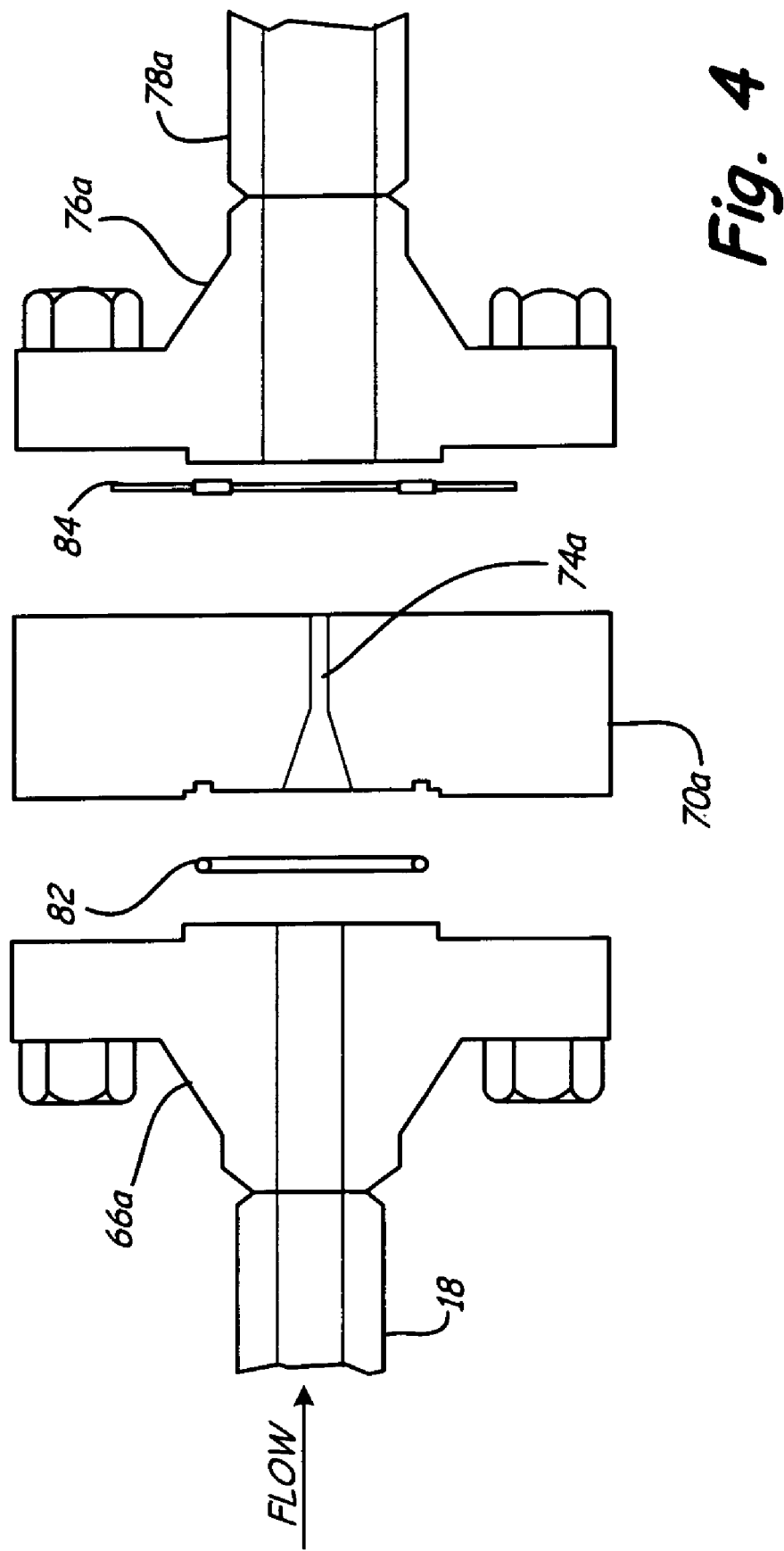
FIG. 4 is an enlarged, partial exploded view of the cascade nozzle assembly of the continuous solids pressure letdown system.

FIG. 3 shows an enlarged, exploded view of cascade nozzle assembly 28. FIG. 4 shows an enlarged, partial exploded view of cascade nozzle assembly 28 and will be discussed in conjunction with FIG. 3. Cascade nozzle assembly 28 is a multi-orificed assembly having a first end 68a and a second end 68b. In the embodiment shown in FIG. 3, cascade nozzle assembly 28 includes first orifice (or nozzle) plate 70a, second orifice plate 70b, third orifice plate 70c, fourth orifice plate 70d, fifth orifice 70e plate, sixth orifice plate 70f, seventh orifice plate 70g, first stagnation section 72a, second stagnation section 72b, third stagnation section 72c, fourth stagnation section 72d, fifth stagnation section 72e, and sixth stagnation section 72f. First orifice plate 70a has a throat 74a with diameter $TD_a$, second orifice plate 70b has a throat 74b with diameter $TD_b$, third orifice plate 70c has a throat 74c with diameter $TD_c$, fourth orifice plate 70d has a throat 74d with diameter $TD_d$, fifth orifice 70e plate has a throat 74e with diameter $TD_e$, sixth orifice plate 70f has a throat 74f with diameter $TD_f$, and seventh orifice plate 70g has a throat 74g with diameter $TD_g$. The diameters $TD_a$-$TD_g$ of throats 74a-74g, respectively, increases from first end 68a to second end 68b of cascade nozzle assembly 28. In addition, each of the diameters of throats 74a-74g has a converging inlet with an included convergence angle of less than approximately 30 degrees, or an approximately 15 degree half angle. The inlets of each throat 74a-74g are angled because a straight path can potentially result in bridging and plugging problems upstream of throats 74a-74g. In an exemplary embodiment, the flow rate of the dusty gas stream entering cascade nozzle assembly 28 is between approximately 70 feet per second and approximately 200 feet per second.

Each of stagnation sections 72a-72f includes a head flange 76, a coupling 78, and an aft flange 80. For simplicity, the components of stagnation sections 70a-70f will be described without a reference letter unless a specific head flange 76, coupling 78, or aft flange 80 is referred to. In that case, the corresponding letter will be included. For example, first stagnation section 72a includes head flange 76a, coupling 78a, and aft flange 80a. First stagnation section 72a positioned between first orifice plate 70a and second orifice plate 70b, second stagnation section 72b positioned between second orifice plate 70b and third orifice plate 70c, third stagnation section 72c positioned between third orifice plate 70c and fourth orifice plate 70d, fourth stagnation section 72d positioned between fourth orifice plate 70d and fifth orifice plate 70e, fifth stagnation section 72e positioned between fifth orifice plate 70e and sixth orifice plate 70f, and sixth stagnation section 72f positioned between sixth orifice plate 70f and seventh orifice plate 70g. First coupling 78a has a diameter $D_a$, second coupling 78b has a diameter $D_b$, third coupling 78c has a diameter $D_c$, fourth coupling 78d has a diameter $D_d$, fifth coupling 78e has a diameter $D_e$, and sixth coupling 78f has a diameter $D_f$. Diameters $D_a$-$D_f$ of couplings 78a-78f progressively increase in the following order: $D_a < D_b < D_c < D_d < D_e < D_f$. Diameters $D_a$-$D_f$ of couplings 78a-78f increase from first end 68a to second end 68b of cascade nozzle assembly 28 in order to maintain the dusty gas velocity within each stagnation section at approximately 100 ft/sec as the gas pressure continuously drops through cascade nozzle assembly 28. The axial lengths of couplings 78a-78f are also relatively long and progressively get larger. In an exemplary embodiment, each of couplings 78a-78f has a length greater than approximately 3 inches.

An O-ring 82 is positioned between discharge line 18 and first orifice 70a, between first stagnation section 72a and second orifice plate 70b, between second stagnation section 72b and third orifice plate 70c, between third stagnation section 72c and fourth orifice plate 70d, between fourth stagnation section 72d and fifth orifice plate 70e, between fifth stagnation section 72e and sixth orifice plate 70f, and between sixth stagnation section 72f and seventh orifice plate 70g. O-ring 82 seals the connections and prevents any leakage of the dusty gas stream into the environment. In addition, a gasket 84 is positioned between first orifice plate 70a and first stagnation section 72a, between second orifice plate 70b and second stagnation section 72b, between third orifice plate 70c and third stagnation section 72c, between fourth orifice plate 70d and fourth stagnation section 72d, between fifth orifice plate 70e and fifth stagnation section 72e, between sixth orifice plate 70f and sixth stagnation section 72f, and between seventh orifice plate 70g and intermediate line 30. Gaskets 84 are also used to prevent any leakage of the dusty gas stream in to the environment. In an exemplary embodiment, gaskets 84 are flexitallic gaskets. Cascade nozzle assembly 28 may be connected in any manner known in the art, including, but not limited to: welding, brazing, and bolting. In an exemplary embodiment, couplings 78a-78f are attached to raised neck flanges.

Throats 74a-74g of orifice plates 70a-70g are designed to repetitively increase the flow rate of the dusty gas stream flowing through cascade nozzle assembly 28 before decreasing it once again with an abrupt expansion within each stagnation section coupling 78a-78f. Because diameters $D_a$-$D_f$ of couplings 78a-78f increase from first end 68a to second end 68b of cascade nozzle assembly 28, the pressure of the dusty gas stream will also decrease as it passes through cascade nozzle assembly 28. In an exemplary embodiment, the dusty gas stream passes through throats 74a-74g of each of orifice plates 70*a*-70*g* at a velocity of approximately 450 ft/sec before being de-accelerated to a velocity of approximately 100 ft/sec or below in the downstream stagnation section couplings 78*a*-78*f* and intermediate line 30. The dusty gas stream leaving cascade nozzle assembly 28 is at ambient pressure with a void fraction of between approximately 98% by volume and approximately 99% by volume. The design of cascade assembly 28 also allows for simple disassembly and reassembly during periodic changing of orifice plates 70*a*-70*g* and stagnation sections 72*a*-72*f* at normally scheduled plant maintenance times. Although FIG. 3 depicts cascade nozzle assembly 28 as having seven orifice plates 70*a*-70*g* and six stagnation sections 72*a*-72*f*, cascade nozzle assembly 28 may have any number of orifices and flanges without departing from the intended scope of the present invention.

Figure 5:
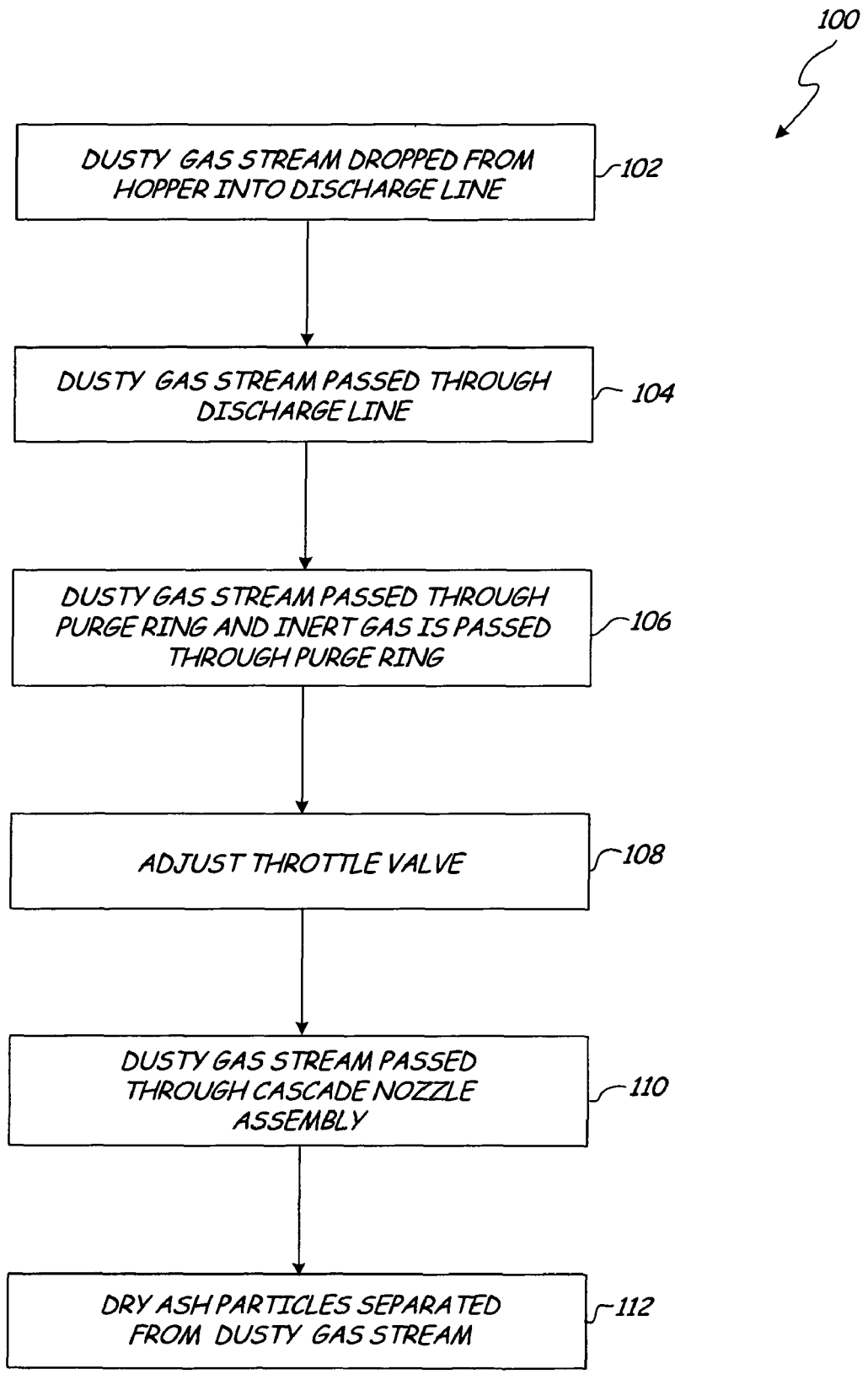
FIG. 5 is a diagram of a method of continually decreasing the solids pressure of a dusty gas.

FIG. 5 shows a diagram of a method of continuously decreasing the solids pressure of a dusty gas stream having dry ash particles 100. The dusty gas stream continuously drops from hopper 14 to discharge line 18, Box 102. In an exemplary embodiment, the dusty gas stream exiting hopper 14 has a pressure of approximately 1000 pounds per square inch and a void fraction of approximately 55% by volume. As the dusty gas stream is passed through discharge line 18, the pressure of the dusty gas stream decreases while the void fraction increases, Box 104. In an exemplary embodiment, discharge line 18 is approximately 200 feet long and the dusty gas stream leaving discharge line 18 has a pressure of approximately 300 pounds per square inch and a void fraction of approximately 85% by volume. The dusty gas stream is then passed through purge ring 20 to control the flow rate of the dusty gas, Box 106. An inert gas is simultaneously passed through throttling gas line 26 to purge ring 20 in order to build up gas back pressure and to prevent dry ash particles from bridging or plugging purge ring 20, Box 106. As depicted in Box 108, the flow rate of the dusty gas stream can be adjusted by throttle valve 26, which is connected to inert gas reservoir 24. After the dusty gas stream passes through purge ring 20, the dusty gas stream is passed through cascade nozzle assembly 28, which has multiple orifices 70 and stagnation sections 72, Box 110. The diameter through cascade nozzle assembly 28 repetitively decreases and increases in order to decrease the pressure of the dusty gas stream. In an exemplary embodiment, the dusty gas stream leaving cascade nozzle assembly 28 has a pressure of approximately 14.7 pounds per square inch and a void fraction of between approximately 98% by volume and approximately 99% by volume. The dusty gas is then sent through filter 32 to separate the dry ash particles from the inert gas, Box 112.

The continuous solids pressure letdown system continuously decreases the pressure of a dusty gas stream passing through the system without using a lock hopper. The system generally includes a discharge line, a purge ring, a cascade nozzle assembly, and a filter. The dusty gas, including dry ash particles, is dropped from a hopper and introduced into the discharge line. The discharge line has a length sufficient to substantially reduce the pressure of the dusty gas stream and increase the void fraction of the dusty gas stream. The dusty gas stream is then sent through the purge ring installed on the discharge line. The purge ring serves two functions. The first function is to control the flow rate of the dusty gas stream by increasing or decreasing a back pressure of the gas by increasing or decreasing a flow of an inert gas. The second function is to prevent bridging or plugging of dry ash particles at the junction of the discharge line and the purge ring. The dusty gas stream then enters the cascade nozzle assembly to further reduce the pressure of the dusty gas stream and to further increase the void fraction of the dusty gas stream. Once the dusty gas stream is at ambient pressure, the dusty gas stream is sent to the filter to separate the dry ash particles from the inert gas.

Although the present invention has been described with reference to preferred embodiments, workers skilled in the art will recognize that changes may be made in form and detail without departing from the spirit and scope of the invention.

The invention claimed is:

1. A continuous pressure letdown system connected to a hopper for decreasing a pressure of a dusty gas stream flowing through the system, the system comprising:
   a discharge line for receiving the dusty gas stream from the hopper;
   a valve connecting the hopper to the discharge line for controlling introduction of the dusty gas stream into the discharge line;
   a cascade nozzle assembly positioned downstream of the discharge line and configured to decrease a pressure of the dusty gas stream over a distance;
   a purge ring connected in the discharge line upstream of the cascade nozzle assembly;
   an inert gas supply connected to the purge ring for introducing an inert gas into the cascade nozzle assembly;
   an inert gas throttle for controlling a flow rate of the inert gas into the cascade nozzle assembly; and
   a filter connected downstream of the cascade nozzle assembly.

2. The system of claim 1, wherein the discharge line is greater than approximately 200 feet in length.

3. The system of claim 1, wherein the filter is a baghouse.

4. The system of claim 1, wherein the velocity of the dusty gas stream entering the cascade nozzle assembly is between about 70 feet per second and about 200 feet per second.

5. The system of claim 1, wherein the dusty gas stream leaving the cascade nozzle assembly has a void fraction of greater than about 90% by volume.

6. The system of claim 1, wherein the cascade nozzle assembly comprises a plurality of orifices having sequentially increasing throat diameters.

7. The system of claim 6, wherein each of the orifices of the cascade nozzle assembly has an included convergence angle of approximately thirty degrees.

8. A continuous pressure letdown system having a dusty gas stream with solid particulates flowing through the system, wherein the system is connected to a hopper, the system comprising:
   a discharge line connected to the hopper;
   a valve for controlling introduction of the dusty gas stream with solid particulates into the discharge line;
   a cascade nozzle assembly positioned downstream of the discharge line for decreasing a pressure of the dusty gas stream;
   a purge ring connected between the discharge line and the cascade nozzle assembly;
   an inert gas supply connected to the purge ring for introducing an inert gas into the cascade nozzle assembly;
   an inert gas throttle for controlling a flow rate of the inert gas into the cascade nozzle assembly; and
   a filter connected downstream of the cascade nozzle assembly for separating the solid particulates from the dusty gas stream.

9. The system of claim 8, wherein the inert gas supply is also connected to the hopper.

10. The system of claim 8, wherein the cascade nozzle assembly comprises a plurality of orifices having varying diameters.

11. The system of claim 10, wherein each of the orifices has an included convergence angle of approximately thirty degrees.

12. The system of claim 8, wherein the dusty gas stream leaving the cascade nozzle assembly has a void fraction of between about 98% by volume and about 99% by volume.

13. The system of claim 8, wherein the hopper is connected to at least one of a cyclone or a candle filter of a gasification system.

14. The system of claim 8, wherein the velocity of the dusty gas stream within the cascade nozzle assembly is between about 70 feet per second and about 200 feet per second.

15. A method of continuously decreasing a pressure of a dusty gas stream flowing through a gasification system, the method comprising:

passing the dusty gas stream through a length of discharge line;

passing the dusty gas stream from the discharge line through a cascade nozzle assembly having a sequentially increasing diameter to incrementally decrease a pressure of the dusty gas stream over a distance; and adjusting flow rate of the dusty gas stream entering the cascade nozzle assembly.

16. The method of claim 15, wherein passing the dusty gas stream through a length of discharge line comprises passing the dusty gas stream through a length of approximately 200 feet.

17. The method of claim 15, wherein adjusting flow rate of the dusty gas stream comprises using a purge ring.

18. The method of claim 15, wherein passing the dusty gas stream from the discharge line through the cascade nozzle assembly having a sequentially increasing diameter comprises alternately decreasing and increasing the diameter of the cascade nozzle assembly.

19. The method of claim 15, wherein passing the dusty gas stream from the discharge line through the cascade nozzle assembly having a sequentially increasing diameter comprises transporting the dusty gas stream through a convergence angle of approximately thirty degrees.

20. The method of claim 15, wherein passing the dusty gas stream through a length of discharge line comprises increasing a void fraction of the dusty gas stream to between about 80% by volume and about 90% by volume.

* * * * *